(12) United States Patent
Thewes et al.

(10) Patent No.: US 7,144,527 B2
(45) Date of Patent: Dec. 5, 2006

(54) FIRE-PROTECTION COATING

(75) Inventors: Volker Thewes, Erftstadt (DE); Andrea Zurstrassen, Cologne (DE)

(73) Assignee: Clariant GmbH, Frankfurt (DE)

( * ) Notice: Subject to any disclaimer, the term of this patent is extended or adjusted under 35 U.S.C. 154(b) by 134 days.

(21) Appl. No.: 10/660,079

(22) Filed: Sep. 11, 2003

(65) Prior Publication Data

US 2004/0051087 A1    Mar. 18, 2004

(30) Foreign Application Priority Data

Sep. 17, 2002  (DE) ............................... 102 43 231

(51) Int. Cl.
  *C09K 21/12*  (2006.01)
  *C09D 5/18*   (2006.01)
  *C09D 7/12*   (2006.01)

(52) U.S. Cl. ............... 252/606; 252/609; 524/100; 524/101; 524/126; 524/133; 524/140; 524/195

(58) Field of Classification Search ............... 252/606, 252/609; 524/100, 101, 126, 133, 140, 195
See application file for complete search history.

(56) References Cited

U.S. PATENT DOCUMENTS

| | | | |
|---|---|---|---|
| 3,658,791 A | 4/1972 | Giuliane et al. | |
| 3,666,543 A | 5/1972 | Maier | |
| 4,001,034 A | 1/1977 | Simkin | |
| 4,221,837 A | 9/1980 | Nicholson et al. | |
| 4,879,320 A | 11/1989 | Hastings | 523/179 |
| 4,965,296 A | 10/1990 | Hastings | 523/179 |
| 5,225,464 A | 7/1993 | Hill, Jr. | 524/100 |
| 5,749,948 A | 5/1998 | Scholz et al. | 106/18.15 |
| 5,879,920 A | 3/1999 | Dale et al. | |
| 5,958,287 A | 9/1999 | Pullen | |
| 6,084,012 A | 7/2000 | Gareiss et al. | |
| 6,124,366 A | 9/2000 | Pullen et al. | |
| 6,251,961 B1 * | 6/2001 | Pirig et al. | 521/179 |
| 6,255,371 B1 * | 7/2001 | Schlosser et al. | 524/100 |
| 6,365,071 B1 | 4/2002 | Jenewein et al. | |
| 6,547,992 B1 * | 4/2003 | Schlosser et al. | 252/609 |
| 6,642,284 B1 * | 11/2003 | Thewes et al. | 521/146 |
| 6,716,899 B1 | 4/2004 | Klatt et al. | |
| 2004/0176510 A1 | 9/2004 | Gepraga | |
| 2004/0227130 A1 | 11/2004 | Hoerold | |
| 2005/0234173 A1 * | 10/2005 | Tsuchikawa et al. | 524/415 |

FOREIGN PATENT DOCUMENTS

| CA | 2135385 A1 * | 12/1993 |
|---|---|---|
| DE | 42 18 184 | 12/1993 |
| DE | 43 43 668 | 6/1995 |

OTHER PUBLICATIONS

English abstract for DE 42 18 184.
USPTO Office Action for U.S. Appl. No. 10/656,313, mailed Jan. 25, 2005.

* cited by examiner

*Primary Examiner*—Matthew A. Thexton
(74) *Attorney, Agent, or Firm*—Anthony A. Bisulca

(57) ABSTRACT

The invention relates to a flame retardant combination comprising, as component A, a phosphinate of the formula (I) and/or a diphosphinate of the formula (II) and/or polymers of these

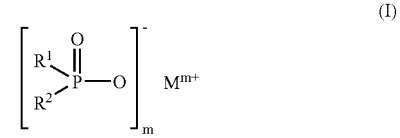

(I)

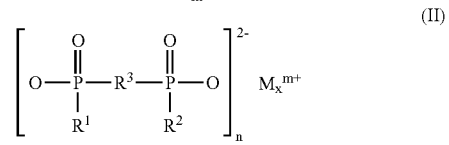

(II)

where
$R^1$ and $R^2$ are identical or different and are $C_1-C_6$-alkyl, linear or branched, and/or aryl; $R^3$ is $C_1-C_{10}$-alkylene, linear or branched, $C_6-C_{10}$-arylene, -alkylarylene or -arylalkylene; M is calcium ions, magnesium ions, aluminum ions and/or zinc ions, m is 2 or 3; n is 1 or 3; x is 1 or 2; and comprising a component B1, B2 and/or B3 wherein B1 is a salt of 1,3,5-triazine compound with polyphosphoric acid, and wherein B2 is a melamine polymetaphosphate, and wherein B3 is a composite salt of polyphosphoric acid with melamine, melam and/or melem.

26 Claims, No Drawings

FIRE-PROTECTION COATING

The invention relates to a fire-protection coating which forms an insulating layer and is based on substances which, in the event of a fire, form a foam layer and form carbon, on film-forming binders, on blowing agents, and on conventional auxiliaries and additives.

Fire-protection layers which form an insulating layer, also termed intumescent coatings, foam when exposed to the type of temperature occurring in the event of a fire, thus, by virtue of this foaming of the abovementioned fire-protection coating preventing, or at least inhibiting, the passage of heat to steel work, ceilings, walls, cables, pipes, and the like.

U.S. Pat. No. 4,965,296 A1 describes a flame-retardant material composed of a flame-retardant coating material and of an electrically conductive material. The flame-retardant coating material here is composed of substances which form foam and form carbon, of a compound which evolves gas, of a film-forming binder, and of appropriate solvents. Other conventional ingredients may be present if desired.

U.S. Pat. No. 4,879,320 describes a similar flame-retardant composition to which, instead of a conductive material, a ceramic fiber material has been added.

U.S. Pat. No. 5,225,464 describes an aqueous intumescent formulation based on a reaction product of phosphoric acid, melamine and monoammonium phosphate. This formulation with pentaerythritol, chlorinated hydrocarbons, and other compounds, in particular polyvinyl acetate, is intended to provide an improved intumescent coating material.

DE 42 18 184 A1 describes an aqueous binder mixture composed of an aqueous solution and/or dispersion of a combination of a) at least one NCO prepolymer which has capped isocyanate groups and has urethane groups and, in the presence of component b), is dispersible and/or soluble in water, and b) a polyamine component composed of at least one (cyclo)aliphatic polyamine having at least two primary and/or secondary amino groups.

Finally, DE 43 43 668 describes expandable, flame-retardant coating compositions composed at least of from 4 to 25% by weight of a film-forming binder, from 10 to 40% by weight of ammonium polyphosphate, from 8 to 40% by weight of at least one substance which carbonizes on exposure to heat, from 6 to 25% by weight of a blowing agent, from 0 to 5% by weight of dispersing agents, and from 0 to 25% by weight of fillers.

The aim of the abovementioned fire-protection coatings of the prior art is to achieve maximum fire-resistance times, using minimum application quantities.

An overall disadvantage of the abovementioned fire-protection coatings is that the foam structures formed in the event of a fire do not permit an improvement in insulating action, and that the reaction does not start until temperatures $T \geq 180°$ C. have been reached.

An object of the invention which follows is therefore to provide fire-protection coatings which achieve longer fire-resistance times for the same application quantity, or achieve fire-resistance times identical with those of the prior art with a reduced application quantity.

It is intended that the reaction start at temperatures $T < 180°$ C.

This object has been achieved by way of a fire-protection coating which forms an insulating layer as described at the outset, which comprises a phosphinic salt of the formula (I) and/or a diphosphinic salt of the formula (II), and/or their polymers,

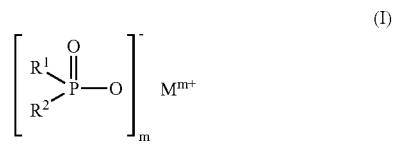

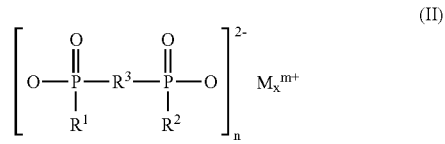

where
$R^1$, $R^2$ are identical or different and are $C_1$–$C_6$-alkyl, linear or branched and/or aryl;
$R^3$ is $C_1$–$C_{10}$-alkylene, linear or branched, $C_6$–$C_{10}$-arylene, -alkylarylene, or -arylalkylene;
M is Mg, Ca, Al, Sb, Sn, Ge, Ti, Zn, Fe, Zr, Ce, Bi, Sr, Mn, Li, Na, K, and/or a protonated nitrogen base;
m is from 1 to 4;
n is from 1 to 4;
x is from 1 to 4.
M is preferably calcium, aluminium or zinc.

The protonated nitrogen bases are preferably the protonated bases of ammonia, melamine, or triethanolamine, in particular $NH_{4+}$.

$R^1$, $R^2$, which are identical or different, are preferably $C_1$–$C_6$-alkyl, linear or branched, and/or phenyl.

$R^1$ and $R^2$, which are identical or different, are particularly preferably methyl, ethyl, n-propyl, isopropyl, n-butyl, tert-butyl, n-pentyl and/or phenyl.

$R^3$ is preferably methylene, ethylene, n-propylene, isopropylene, n-butylene, tert-butylene, n-pentylene, n-octylene or n-dodecylene; phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

The fire-protection coating which forms an insulating layer preferably comprises
from 5 to 30 parts by weight of film-forming binder,
from 10 to 50 parts by weight of substance which forms a foam layer,
from 5 to 25 parts by weight of a substance which forms carbon,
from 5 to 25 parts by weight of a blowing agent, and
from 10 to 50 parts by weight of conventional auxiliaries and additives, and
from 1 to 10 parts by weight of phsophinic salt of the formula (I)
and/or a diphosphinic salt of the formula (II), and/or their polymers.

The fire-protection coating which forms an insulating layer particularly preferably comprises
from 10 to 25 parts by weight of film-forming binder,
from 15 to 40 parts by weight of substance which forms a foam layer, from 7 to 15 parts by weight of a substance which forms carbon, from 7 to 15 parts by weight of a blowing agent, and from 20 to 40 parts by weight of conventional auxiliaries and additives, and from 2 to 5 parts by weight of phosophinic salt of the formula (I) and/or a diphosphinic salt of the formula (II), and/or their polymers.

Preference is given to a fire-protection coating which forms an insulating layer in which the film-forming binders present comprise homopolymers based on vinyl acetate, copolymers based on vinyl acetate, ethylene, and vinyl chloride, copolymers based on vinyl acetate and on the vinyl ester of a long-chain, branched carboxylic acid, copolymers based on vinyl acetate and di-n-butyl malate, copolymers based on vinyl acetate and esters of acrylic acid, copolymers based on styrene and esters of acrylic acid, and/or copolymers based on esters of acrylic acid, vinyltoluenel/acrylol copolymer, styrene/acrylate polymers, vinyl/acrylate copolymers, self-crosslinking polyurethane dispersions.

Preference is given to a fire-protection coating which forms an insulating layer and in which the foam-forming substances present comprise ammonium salts of phosphoric acids and/or polyphosphoric acids.

Preference is given to a fire-protection coating which forms an insulating layer and in which the carbon-forming substances present comprise carbohydrates.

Carbohydrates whose use is preferred are pentaerythritol, dipentaerythritol, tripentaerythritol and/or polycondensates of pentaerythritol.

Preference is given to a fire-protection coating which forms an insulating layer and in which the blowing agents present comprise melamine and/or guanidine, or else their salts, and/or dicyandiamides.

The melamine salts preferably comprise melamine phosphate, melamine cyanurate, melamine borate, melamine silicate, and the guanidine salt preferably comprises guanidine phosphate.

The fire-protection coating which forms an insulating layer also preferably comprises melamine polyphosphate.

Preference is given to a fire-protection coating which forms an insulating layer and in which the auxiliaries and additives present comprise glass fibers, mineral fibers, kaolin, talc, aluminum oxide, aluminum hydroxide, magnesium hydroxide, precipitated silicas, silicates, and/or pulverized celluloses.

The inventive fire-protection coating (intumescent coating) is used in the form of a paint which can be applied by brush, spray, or roller, to protect various substrates, preferably steel, wood, electrical cables, and pipes.

In the examples below, intumescent coatings are prepared, and applied to standard steel sheets, and their effectiveness is determined. The test for insulating capability was based on DIN 4102.

The following products were used in the examples:

®Pliolite (Solid) (Goodyear, France)

This is a newtonian, thermoplastic resin based on vinyl-toluene-acrylate copolymer.

®Mowilith DM230

This is a plasticizer-free, aqueous copolymer dispersion of strength about 50%, composed of vinyl acetate and Versatic ester.

®Exolit AP 462 (Clariant GmbH, Frankfurt am Main)

This is a microencapsulated ammonium polyphosphate based on ®Exolit AP 422, prepared by the process of EP-B-0 180 795, and comprising about 10% by weight of encapsulating material, composed of a cured melamine-formaldehyde resin.

®Exolit AP 422 (Clariant GmbH, Frankfurt am Main) is a free-flowing, pulverulent, low-water-solubility ammonium polyphosphate of the formula $(NH_4PO_3)$, where n=20 to 1000, in particular from 500 to 1000. The proportion of the particles whose particle size is smaller than 45 µm is more than 99%.

EXAMPLE 1

Comparison

The following substances were mixed with one another and then appropriately applied to the sheet to be tested:

38 parts by weight of ®Exolit AP 462

10 parts by weight of ®Pliolite (Solid)

8 parts by weight of melamine 8 parts by weight of dipentaerythritol 8 parts by weight of titanium dioxide thickeners, plasticizers and solvents to 100 parts by weight.

The fire test on the coated sheet, based on DIN 4102, gave a reaction starting temperature T=180° C., the application quantity being 100%.

EXAMPLE 2

Inventive

The following substances were mixed with one another and then appropriately applied to the sheet to be tested:

32 parts by weight of ®Exolit AP 462

10 parts by weight of ®Pliolite (Solid)

13 parts by weight of melamine 8 parts by weight of dipentaerythritol 8 parts by weight of titanium dioxide 5 parts by weight of aluminum diethylphosphinate thickeners, plasticizers and solvents to 100 parts by weight.

The fire test on the coated sheet, based on DIN 4102, gave a reaction starting temperature T=100° C., the application quantity being 100%.

EXAMPLE 3

Comparison

The following substances were mixed with one another and then appropriately applied to the sheet to be tested:

30 parts by weight of ®Exolit AP 422

22 parts by weight of ®Mowilith DM230

19 parts by weight of melamine 13 parts by weight of pentaerythritol 5 parts by weight of titanium dioxide thickeners, fillers, water, dispersants and preservatives to 100 parts by weight.

The fire test on the coated sheet, based on DIN 4102, gave a fire-resistance time of 86 minutes, the application quantity being 100%.

EXAMPLE 4

Inventive

The following substances were mixed with one another and then appropriately applied to the sheet to be tested:
18 parts by weight of ®Exolit AP 422
22 parts by weight of ®Mowilith DM230
30 parts by weight of melamine
13 parts by weight of pentaerythritol
5 parts by weight of titanium dioxide
2 parts by weight of aluminum diethylphosphinate
thickeners, fillers, water, dispersants and preservatives to 100 parts by weight.

The fire test on the coated sheet, based on DIN 4102 gave a fire-resistance time of 87 minutes, the application quantity being 80%.

Using the inventive fire-protection coating, the fire-resistance time can be increased advantageously, or the application quantity can be reduced advantageously. There is also a marked reduction in reaction start temperature.

The invention claimed is:

1. A fire-protection coating material capable of forming an insulating layer comprising a compound or mixture of compounds selected from the group consisting of a phosphinic salt of the formula (I), a diphosphinic salt of the formula (II), a mixture of formula (I) and formula (II), a polymer of formula (I), a polymer of formula (II), and a mixture of polymers of formula (I) and formula (II),

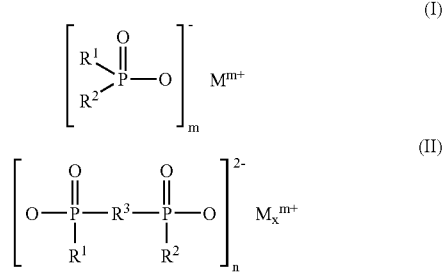

where
$R^1$, $R^2$ are identical or different and are $C_1$–$C_6$-alkyl, linear or branched and aryl;
$R^3$ is $C_1$–$C_{10}$-alkylene, linear or branched, $C_6$–$C_{10}$-arylene, -alkylarylene, or -arylalkylene;
M is Mg, Ca, Al, Sb, Sn, Ge, Ti, Fe, Zr, Ce, Bi, Sr, Mn, Li, Na, K, or a protonated nitrogen base;
m is from 1 to 4;
n is from 1 to 4;
x is from 1 to 4.

2. The fire-protection coating material capable of forming an insulating layer, as claimed in claim 1, wherein M is calcium, aluminum, or zinc.

3. The fire-protection coating material capable of forming an insulating layer, as claimed in claim 1, wherein $R^1$ and $R^2$ are identical or different and are $C_1$–$C_6$-alkyl, linear or branched, and/or phenyl.

4. The fire-protection coating capable of forming an insulating layer, as claimed in claim 1, wherein $R^1$ and $R^2$ are identical or different and are methyl, ethyl, n-propyl, isopropyl, n-butyl, tert-butyl, n-pentyl or phenyl.

5. The fire-protection coating capable of forming an insulating layer, as claimed in claim 1, wherein $R^3$ is methylene, ethylene, n-propylene, isopropylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, tert-butylnaphthylene, phenylmethylene, phenylethylene, phenylpropylene or phenylbutylene.

6. An article comprising the fire-protection coating material capable of forming an insulating layer as claimed in claim 1.

7. A fire-protection coating material capable of forming an insulating layer, comprising:
from 5 to 30 parts by weight of a film-forming binder,
from 10 to 50 parts by weight of a substance which forms a foam layer,
from 5 to 25 parts by weight of a substance which forms carbon,
from 5 to 25 parts by weight of a blowing agent, and
from 10 to 50 parts by weight of at least one auxiliary or additive, and
from 1 to 10 parts by weight of aluminium diethylphosphinate.

8. The fire-protection coating material capable of forming an insulating layer, as claimed in claim 7, comprising:
from 10 to 25 parts by weight of the film-forming binder,
from 15 to 40 parts by weight of the substance which forms a foam layer,
from 7 to 15 parts by weight of the substance which forms carbon,
from 7 to 15 parts by weight of the blowing agent, and
from 20 to 40 parts by weight of the at least one auxiliary and additive, and
from 2 to 5 parts by weight of the aluminium diethylphosphinate.

9. The fire-protection coating material capable of forming an insulating layer, as claimed in claim 7, wherein the film-forming binder is selected from the group consisting of:
homopolymers based on vinyl acetate,
copolymers based on vinyl acetate, ethylene, and vinyl chloride,
copolymers based on vinyl acetate and on the vinyl ester of a long-chain, branched carboxylic acid,
copolymers based on vinyl acetate and di-n-butyl malate,
copolymers based on vinyl acetate and esters of acrylic acid,
copolymers based on styrene and esters of acrylic acid,
copolymers based on esters of acrylic acid,
vinyltoluenel/acrylol copolymer,
styrene/acrylate polymers,
vinyl/acrylate copolymers,
self-crosslinking polyurethane dispersions.

10. The fire-protection coating material capable of forming an insulating layer, as claimed in claim 7, wherein the substance which forms a foam layer is selected from the group consisting of ammonium salts of phosphoric acids and polyphosphoric acids.

11. The fire-protection coating material capable of forming an insulating layer, as claimed in claim 7, wherein the substance which forms carbon is a carbohydrate.

12. The fire-protection coating material capable of forming an insulating layer, as claimed in claim 7, wherein the substance which forms carbon is selected from the group consisting of pentaerythritol, dipentaerythritol, tripentaerythritol and polycondensates of pentaerythritol.

13. The fire-protection coating material capable of forming an insulating layer, as claimed in claim 7, wherein the at least one auxiliary or additive is selected from the group consisting of glass fibers, mineral fibers, kaolin, talc, aluminum oxide, aluminum hydroxide, magnesium hydroxide, precipitated silicas, silicates and pulverulent celluloses.

14. The fire-protection coating material capable of forming an insulating layer, as claimed in claim 7, wherein the blowing agent is selected from the group consisting of melamine, guanidine, their salts, and dicyandiamide.

15. The fire-protection coating material capable of forming an insulating layer, as claimed in claim 14, wherein the melamine salt is selected from the group consisting of melamine phosphate, melamine cyanurate, melamine borate, melamine silicate, and wherein the guanidine is guanidine phosphate.

16. The fire-protection coating material capable of forming an insulating layer, as claimed in claim 7, further comprising melamine polyphosphate.

17. An article comprising the fire-protection coating material capable of forming an insulating layer as claimed in claim 7.

18. The article as claimed in claim 17, wherein the article is selected from the group consisting of a steel article, ceiling, wall, cable, and pipe.

19. An article comprising a fire protection coating capable of forming an insulating layer, wherein the insulating layer comprises a compound or mixture of compounds selected from the group consisting of a phosphinic salt of the formula (I), a diphosphinic salt of the formula (II), a mixture of formula (I) and formula (II), a polymer of formula (I), a polymer of formula (II), and a mixture of polymers of formula (I) and formula (II),

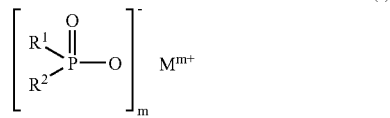

(I)

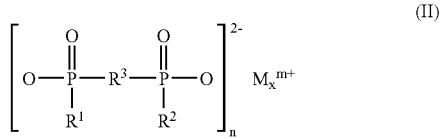

(II)

where
R$^1$, R$^2$ are identical or different and are C$_1$–C$_6$-alkyl, linear or branched and aryl;
R$^3$ is C$_1$–C$_{10}$-alkylene, linear or branched, C$_6$–C$_{10}$-arylene, -alkylarylene, or -arylalkylene;
M is Mg, Ca, Al, Sb, Sn, Ge, Ti, Fe, Zr, Ce, Bi, Sr, Mn, Li, Na, K, or a protonated nitrogen base;
m is from 1 to 4;
n is from 1 to 4;
x is from 1 to 4.

20. The article as claimed in claim 19, wherein the article is selected from the group consisting of a steel article, ceiling, wall, cable, and pipe.

21. A fire-protection coating material capable of forming an insulating layer comprising aluminum diethylphosphinate.

22. The fire-protection coating material capable of forming an insulating layer of claim 21, further comprising:
from 10 to 50 parts by weight of a substance which forms a foam layer,
from 5 to 25 parts by weight of a substance which forms carbon,
from 5 to 25 parts by weight of a blowing agent, and
from 10 to 50 parts by weight of at least one auxiliary or additive, and
from 1 to 10 parts by weight of the aluminum diethylphosphinate.

23. A fire-protection coating material capable of forming an insulating layer comprising zinc diethylphosphinate.

24. The fire-protection coating material capable of forming an insulating layer of claim 23, further comprising:
from 10 to 50 parts by weight of a substance which forms a foam layer,
from 5 to 25 parts by weight of a substance which forms carbon,
from 5 to 25 parts by weight of a blowing agent, and
from 10 to 50 parts by weight of at least one auxiliary or additive, and
from 1 to 10 parts by weight of the zinc diethylphosphinate.

25. An article comprising the fire-protection coating material capable of forming an insulating layer as claimed in claim 21.

26. An article comprising the fire-protection coating material capable of forming an insulating layer as claimed in claim 23.

* * * * *